US012777988B2

(12) United States Patent
Hiddema et al.

(10) Patent No.: US 12,777,988 B2
(45) Date of Patent: Nov. 3, 2026

(54) METHOD FOR CULTIVATING A PIECE OF FARMLAND AND A TRACTOR FOR EMPLOYING THE METHOD

(71) Applicant: Agxeed Holding B.V., Oirlo (NL)

(72) Inventors: Joris Jan Hiddema, Grubbenvorst (NL); Laurentius Hubertus Margaretha Schmitz, Mariahoop (NL)

(73) Assignee: AGXEED HOLDING B.V., Oirlo (NL)

( * ) Notice: Subject to any disclaimer, the term of this patent is extended or adjusted under 35 U.S.C. 154(b) by 386 days.

(21) Appl. No.: 18/715,857

(22) PCT Filed: Dec. 6, 2022

(86) PCT No.: PCT/NL2022/050702
§ 371 (c)(1),
(2) Date: Jun. 3, 2024

(87) PCT Pub. No.: WO2023/106918
PCT Pub. Date: Jun. 15, 2023

(65) Prior Publication Data
US 2025/0040460 A1 Feb. 6, 2025

(30) Foreign Application Priority Data
Dec. 7, 2021 (NL) .................................... 2030058

(51) Int. Cl.
*A01B 63/02* (2006.01)
*A01B 51/02* (2006.01)
*A01B 59/06* (2006.01)

(52) U.S. Cl.
CPC .......... *A01B 51/026* (2013.01); *A01B 59/064* (2013.01); *A01B 63/02* (2013.01)

(58) Field of Classification Search
None
See application file for complete search history.

(56) References Cited

U.S. PATENT DOCUMENTS 2,376,539 A * 5/1945 Hitchcock .............. A01D 41/04 56/228
RE22,991 E * 3/1948 Hitchcock et al. .... A01D 41/04 254/8 R
(Continued)

FOREIGN PATENT DOCUMENTS

EP 1406140 A2 * 4/2004 ............. G01S 19/14
EP 3567446 A1 * 11/2019 ........... A01B 69/008
(Continued)

*Primary Examiner* — Shelley Chen
(74) *Attorney, Agent, or Firm* — Richard M. Goldberg

(57) ABSTRACT

A method for cultivating a piece of farmland, includes providing an autonomous tractor having a lifting device for connecting an agricultural implement for performing an agricultural operation to the tractor and an engine for driving the implement, and crossing the farmland with the tractor while the agricultural implement is driven by the engine to cultivate the piece of farmland, wherein in a step preceding the cultivation of the farmland, the agricultural implement is put on top of the tractor with the lifting device, such that the centre of mass of the agricultural implement is within the footprint of the tractor, and in a second step the agricultural implement is operatively connected with the engine of the tractor, whereafter the farmland is crossed with the tractor while the agricultural implement is supported by the tractor and driven by the engine thereof to cultivate the piece of farmland.

9 Claims, 2 Drawing Sheets

(56) References Cited

U.S. PATENT DOCUMENTS

| | | | | |
|---|---|---|---|---|
| 9,265,187 | B2 | 2/2016 | Cavender-Bares et al. | |
| 10,433,477 | B2 | 10/2019 | Sheppard et al. | |
| 11,144,055 | B2 * | 10/2021 | Oetken | E02F 9/205 |
| 2004/0068352 | A1 * | 4/2004 | Anderson | A01B 69/008 701/25 |
| 2004/0193349 | A1 * | 9/2004 | Flann | A01B 69/008 701/50 |
| 2018/0325009 | A1 | 11/2018 | Blackwell et al. | |
| 2020/0033143 | A1 * | 1/2020 | Hiramatsu | G01C 21/34 |
| 2020/0089230 | A1 * | 3/2020 | Oetken | E02F 9/205 |
| 2020/0174491 | A1 * | 6/2020 | Boydens | A01F 15/08 |
| 2020/0240111 | A1 * | 7/2020 | Saiki | E02F 9/2045 |
| 2021/0051835 | A1 | 2/2021 | Beaujot | |
| 2021/0168989 | A1 | 6/2021 | Leeb | |
| 2022/0111913 | A1 * | 4/2022 | Standaert | B60L 53/14 |

FOREIGN PATENT DOCUMENTS

| | | | | | |
|---|---|---|---|---|---|
| EP | 3695694 | A1 | * | 8/2020 | A01D 34/008 |
| EP | 3695700 | A1 | * | 8/2020 | A01D 34/008 |
| EP | 3695700 | B1 | * | 11/2024 | A01D 34/008 |
| JP | 2017182376 | A | * | 10/2017 | G05D 1/0219 |
| JP | 2018120491 | A | * | 8/2018 | A01B 69/008 |
| JP | 6663366 | B2 | * | 3/2020 | A01B 69/008 |
| KR | 102272676 | B1 | * | 7/2021 | B25J 11/00 |
| WO | 2015057630 | A1 | | 4/2015 | |
| WO | WO-2017169373 | A1 | * | 10/2017 | G05D 1/648 |
| WO | WO-2019082692 | A1 | * | 5/2019 | G01C 21/34 |
| WO | 2020058522 | A2 | | 3/2020 | |
| WO | 2020106142 | A1 | | 5/2020 | |
| WO | 2020106143 | A1 | | 5/2020 | |
| WO | 2020152123 | A1 | | 7/2020 | |
| WO | 2021146615 | A1 | | 7/2021 | |

* cited by examiner

METHOD FOR CULTIVATING A PIECE OF FARMLAND AND A TRACTOR FOR EMPLOYING THE METHOD

GENERAL FIELD OF THE INVENTION

The present invention pertains in general to a method for cultivating a piece of farmland, using a tractor and connected thereto an agricultural implement for performing an agricultural operation, the method comprising providing that the tractor has a lifting device for connecting the agricultural implement to the tractor and an engine for driving the said implement, and crossing the farmland with the tractor while the agricultural implement is driven by the engine to cultivate the piece of farmland. The invention also pertains to a tractor suitable for performing the method.

BACKGROUND OF THE INVENTION

For cultivating a piece of farmland it is common to use a versatile tractor, which is used as a towing vehicle and to provide the power to cultivate the land, and connect thereto a particular agricultural implement as needed for performing a desired agricultural operation such as ploughing, sowing, spraying, harvesting etc. This way, one tractor can be used for performing multiple different agricultural operations. Typically, the tractor has a hydraulic lifting device, such as the Ferguson 3-point linkage system, which can be used to connect various different implements, and position them with respect to the land. For this, the lifting device is typically able to lift the implement while making an angle up to about 50-60° at maximum. At the opposite side of the tractor, typically one or more counter weights are present to balance the weight of the implement to make sure that the wheels of the tractor, in particular the wheels at the opposite site of the implement, remain on the land under sufficient load to enable reliable driving and controlling of the tractor.

OBJECT OF THE INVENTION

It is an object to provide an improved method for cultivating a piece of farmland, and to provide a tractor for performing this improved method.

SUMMARY OF THE INVENTION

In order to meet the object of the invention the method as known from the art and described here above was improved in that the tractor used in the method is an autonomous tractor, and in that in a first step preceding the cultivation of the farmland, the agricultural implement is put on top of the tractor with the said lifting device, such that the centre of mass of the agricultural implement is within the footprint of the tractor, and in a second step the agricultural implement is operatively connected with the engine of the tractor, whereafter the farmland is crossed with the tractor while the agricultural implement is supported by the tractor and driven by the engine thereof to cultivate the piece of farmland. Thus, in this novel method the implement is being supported by a top surface of the bulk of the tractor (preferably using dedicated supporting surfaces), instead of being carried by a lifting device of the tractor.

The development of this new method was based on several recognitions of downsides of the prior art method of cultivation. Although being versatile in the sense that one tractor can be used to perform multiple completely different agricultural operations by connecting corresponding agricultural implements, one of the consequences of present-day cultivation is that such a tractor nowadays is extremely heavy. This is i.a. because tractors are developed such that they can be used in conjunction with even the largest and heaviest implements, making the tractors inherently heavier, and these implements on their turn also preferably being as large (and thus heavy) as possible since the operator of a tractor is a human operator. Labour is very costly and thus, every option to reduce the labour time needed to cultivate land is exercised. Inherently, large implements mean that the cultivation takes less time and thus less costly labour. Large and heavy implements on their turn mean that heavy counter weights are often used at the opposite site of the tractor. All-in-all this means that the weight of the combination of the tractor and implement is so heavy that there is a severe risk of compacting the land and thus deterioration of the cultivation properties of this land.

The above series of recognitions lead to the insight that it is advantageous to use an autonomous tractor, since for such a tractor labour costs is not an issue. This on its turn means that smaller implements can be used, and thus a less heavy tractor, since such a tractor can run without labour for 24 hours per day. More importantly, an autonomous tractor does not need to have an operator cabin. This on its turn means that it is an option to position the implement on top of the tractor and let the tractor support the implement while the centre of mass of the agricultural implement is within the footprint of the tractor. This means on its turn that a heavy counter weight can be dispensed with and still allow good drive control. All in all, this way (less heavy tractor, less heavy implement, no counter weight) more than 60-80% (or even more) weight reduction can be achieved per square centimetre at site where the tractor is in contact with the farmland, thereby preventing an unwanted level of soil compaction. However, another essential part of the invention is the fact that the implement can be put on top of the tractor with the lifting device of the tractor itself. Although not difficult to arrange once knowing that the lifting device must be able to do this, up to now this has not been necessary in the prior art, and therefore typical existing lifting device would not be able to do that. In the art, when it is needed to put a device on top of a tractor, a separate crane is used. This however means that a separate, expensive crane is needed, as well as an operator who can control the crane. A practical consequence of such a set up is that an implement after being put on a tractor is left there until the end of the cultivation season, and no exchange for another implement is performed. This means that the tractor has the lost its property of being a versatile device that can be used for multiple completely different agricultural operations. In the present method, versatility is preserved.

In the art tractors that support on their surface an agricultural implements are known as such.

For example, U.S. Pat. No. 9,265,187 (assigned to Row-Bot Systems LLC) provides an autonomous vehicle for selectively performing a cultivation task in an agricultural field while self-navigating between rows of planted crops. The autonomous vehicle platform includes a vehicle base with an engine for autonomously crossing the field and driving the implement and a mixer. The vehicle further includes a seeding structure, a navigation module, and central processing unit. The ground engaging implement is configured to collect soil from the surface of the agricultural field. The mixer is configured to mix seeds with the collected soil to create seed balls. The seeding structure is further configured to distribute the seed balls in the agricultural field. The CPU is in communication with the navigation module and is programmed with a self-direction program to autonomously steer the autonomous vehicle platform while distributing the seed balls.

U.S. Pat. No. 10,433,477 (assigned to Morrid Industries Ltd) discloses an autonomous agricultural system configured to dispense an agricultural product within a field, with the system including a supply station, an autonomous agricultural tractor coupled to a station for transport therewith, and product containers stored on the station, and a powered transfer mechanism operably mounted on the machine.

US2021168989 (assigned to Horsch Leeb Application Systems GmbH) discloses an autonomous agricultural machine comprising a self-propelled tractor and an agricultural implement. The agricultural machine comprises at least one chassis which bears components of the agricultural machine, and at least one central processing unit. In particular, the agricultural machine may comprise a distributor boom, in particular a spraying boom, which is height-adjustable relative to the chassis and/or adjustable relative to the chassis in the rotational position thereof, for example for forming a field sprayer or a fertilizer spreader.

While the above autonomous vehicles may have a practical use, none of them discloses a versatile autonomous tractor having a lifting device that enables putting an agricultural implement, chosen from a group of multiple different implements for performing various different agricultural operations, on top of this tractor with this lifting device.

The present invention is also embodied in an autonomous tractor for autonomously cultivating a piece of farmland, the tractor having a lifting device for lifting an agricultural implement and connecting it to the tractor, and an engine for driving the said implement when connected to the tractor to perform an agricultural operation to cultivate the piece of farmland, wherein the lifting device is arranged to connect the agricultural implement to the tractor by putting the implement on top of the tractor such that the centre of mass of the agricultural implement is within the footprint of the tractor, in particular while the implement is operable to perform the agricultural operation. This sets of the present invention from a static positioning of an implement on top of a tractor, such as for example solely with the aim of transport (and not cultivation).

Definitions

A tractor is an agricultural vehicle that is used to transport an agricultural implement over a piece of farmland and to provide the energy needed for the implement to cultivate the land. It commonly but not necessarily, is a powerful vehicle with a gasoline, diesel or electric engine and large rear wheels or endless belt tracks (so called caterpillar tracks).

An autonomous tractor is a tractor that can automatically perceive its environment, make decisions based on what it perceives and recognizes and then actuate a movement or manipulation within that environment. These decision-based actions include but are not limited to starting, stopping, and maneuvering around obstacles that are in its way. Such a tractor can cross farmland without needing continuous control of a human operator, and when an agricultural machine is operatively connected to the tractor, it can autonomously cultivate the land.

An agricultural implement is a machine designed and used for performing an agricultural operation for cultivating a piece of farmland such as for example ploughing, spreading fertilizer, sowing seed, spraying, harvesting, chaff cutting, or any other agricultural operation. Typically, such an implement is hauled or towed by mechanical power provided for by a tractor.

A footprint of a tractor the amount of geographic space covered by the tractor, thus the area when viewed from above that the tractor occupies.

Farmland is land that is used for or suitable for farming.

Automatically means without the need of (human) operator intervention. Automatically does not exclude that something is operator initiated or stopped as long the process can be completed without needing operator intervention.

A central processing unit or CPU is an electronic circuitry within a computer system that carries out the instructions of a computer program by performing the basic arithmetic, logic, controlling and input/output (I/O) operations specified by the instructions. The term "CPU" may refer to a tangible (single) processor, more specifically to its processing unit and control unit (CU), but may also refer to multiple processors distributed over a networked system operating as if part of one single processor.

EMBODIMENTS OF THE INVENTION

In an embodiment of the method according to the invention the second step of operatively connecting the implement with the engine of the tractor, is performed automatically while the first step, i.e. putting the agricultural implement on top of the tractor with the lifting device of the tractor. Thus, by putting the implement on top of the tractor, the connection between the implement and the engine is automatically made by mating parts that adjoin and form an operative unit. This makes the method easier to perform.

In another embodiment, after the agricultural implement is put on top of the tractor with the said lifting device, the lifting device is de-coupled from the implement. This has i.a. the advantage that the lifting device can be used to connect another implement to the tractor. Indeed, it is foreseen in yet a further embodiment that during the crossing of the piece of farmland, the lifting device is used for carrying a second agricultural implement.

In still another embodiment of the method according to the invention the engine is additionally used for driving the autonomous tractor.

In again another embodiment the agricultural implement is used for an agricultural operation that involves spreading material, other than soil of the farm land itself, over the piece of farmland, such as for example an agricultural operation that is chosen from the group that consists of 1) spraying of a liquid such as water or crop protection products, 2) sowing of seeds, 3) planting of propagating material such as bulbs, cuttings or young plants, and 4) spreading of solids such as artificial fertiliser or manure. Not only is the starting weight of the tractor plus implement relatively heavy for these kinds of operations (the weight of the goods to be spread is often as much or even more then the implement itself), also the weight continuously declines during the operation. For regular tractors this means that the counterweight is chosen to meet the average weight of the implement during cultivation which means that it is generally suboptimal during the first part of the cultivation and during the last part of the cultivation. With the current invention that disadvantage has been overcome.

In yet again another embodiment, after the piece of farmland is cultivated, the agricultural implement is taken off the tractor using the lifting device, whereafter the agricultural implement is de-coupled from the lifting device and stored until further use. This way, no external crane is needed for removing the implement. Advantageously, in an embodiment wherein the agricultural implement has a longitudinal direction which direction in essence runs parallel to the surface of the piece of farmland when cultivating this farmland, the agricultural implement is stored with its longitudinal direction extending in essence vertically. For this, the lifting device turns the implement over an angle of about 90° while removing it from the top of the tractor. Vertical storage is advantageous since less space is needed. With prior art tractors this is not a practical option since a vertically stored implement would have to be turned to attain a horizontal position before it can be connected to a tractor. For this an additional crane would typically be needed. That can be avoided when using the present invention while still having the benefit of requiring less storage space when the implement is not in use.

The above embodiments of the method according to the invention correspond to further embodiments of the tractor according to the invention. In even a further embodiment of the tractor according to the invention the lifting device is arranged to turn the agricultural implement over an angle of at least 90° while lifting the implement from a support to the top of the tractor. Preferably, the lifting device is arranged to turn the agricultural implement over an angle between 90° and 180° while lifting the implement from a support, such as a concrete floor in a storage hall, to the top of the tractor.

The invention will now be further explained using the following figures.

DETAILED DESCRIPTION

FIG. 1

Figure 1:
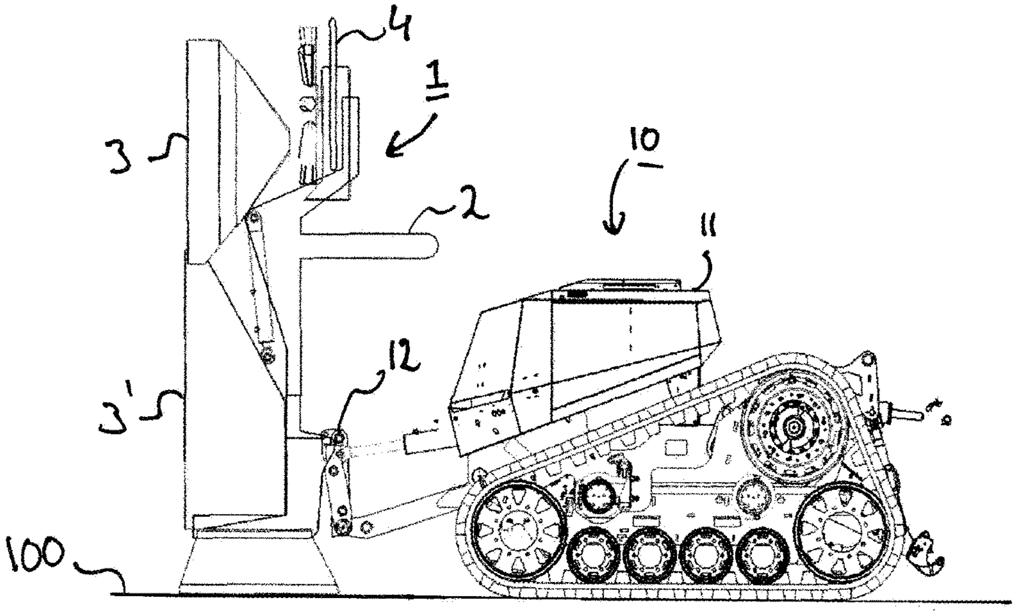
FIG. 1 is a schematic view of an implement stored in an upright position and an autonomous tractor with a lifting device connected to the implement.

FIG. 1 is a schematic view of an implement 1 stored in an upright position on a concrete floor 100, and an autonomous tractor 10 with a lifting device 12 connected to the implement 1. The autonomous tractor as such can be any tractor as known from the art, such as for example described in WO2020/106142, WO2020/106143 and WO2020/152123, albeit that the lifting device 12 is adapted to be able and lift the implement 1 and turn it over an angle of 90° at the same time (see below with respect to FIGS. 2 and 3).

Implement 1 in this example is a fertiliser spreader that has a hopper section 3 for keeping a first portion of the fertiliser, as well as a main storage section 3' out of which fertiliser can be fed into hopper 3 when the implement is in operation. At the outlet of the hopper a spreader 4 is provided. This implement does not differ essentially from a regular fertiliser spreader albeit that she is provided with a connector 2 that, when the implement is put on top of tractor 10, supported by roof section 11, is able to operatively connect the implement with the engine of the tractor. The engine itself is not shown in FIG. 1, it is positioned below roof section 11.

As depicted, the implement is connected to the lifting device 12 of the tractor, such that the implement can be picked off the concrete floor 100 to be operatively connected to the tractor.

FIG. 2

Figure 2:
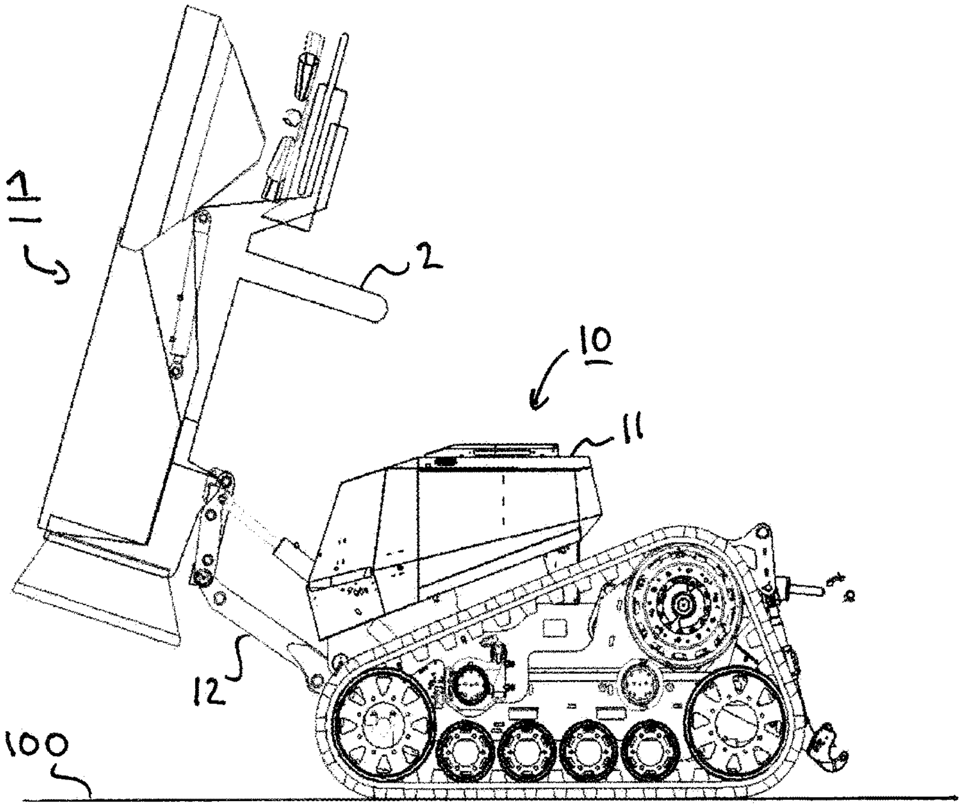
FIG. 2 is a schematic side view of the lifting device putting the implement on top of the tractor.

FIG. 2 is a schematic side view of the lifting device 12 putting the implement on top of the tractor, i.e. on roof section 11. The same features have the same reference number as in FIG. 1. As can be seen, the lifting device 12 is able to lift the implement 1, tilt it, and move it towards a position where it is supported by the bulk of the tractor 10. In this process, the connector 2 is positioned automatically towards a mating part of the tractor (not shown) to provide for the operative connection between the implement and the engine of the tractor in order to be able and drive the implement to spread fertiliser.

FIG. 3

Figure 3:
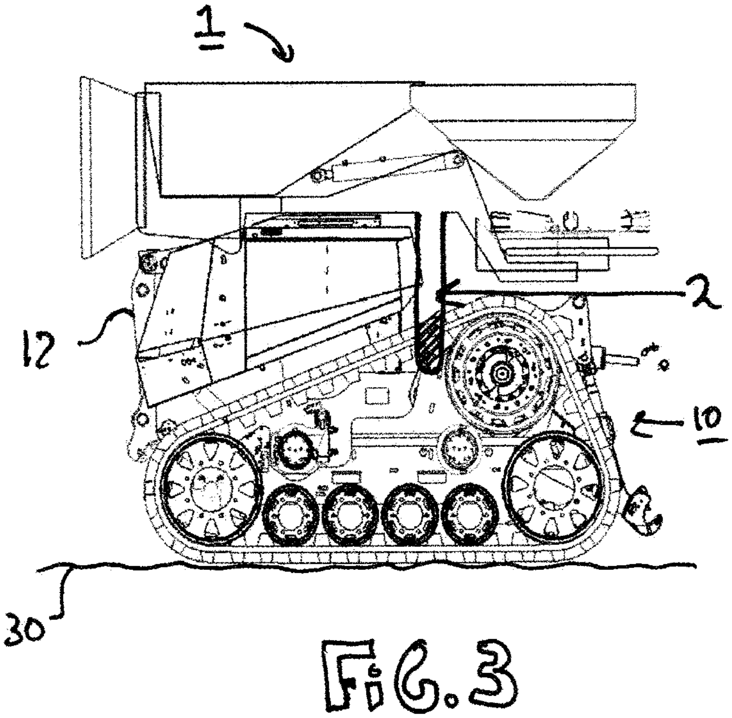
FIG. 3 is a schematic side view of the tractor with the implement in operative connection.

FIG. 3 is a schematic side view of the tractor 10 with the implement 1 in operative connection, while the combination is present on a piece of farmland 30. The connector 2, indicated in bold for better understanding of the schematic drawing, is in this configuration mated with the tractor such that the engine is connected to the implement to be able and drive it. In the shown configuration, the lifting device 12 is still connected to the implement, although the lifting device no longer supports this implement. The full weight of the implement is supported by a top surface of the tractor, such that the centre of mass of the implement is within the footprint of the tractor

FIG. 4

Figure 4:
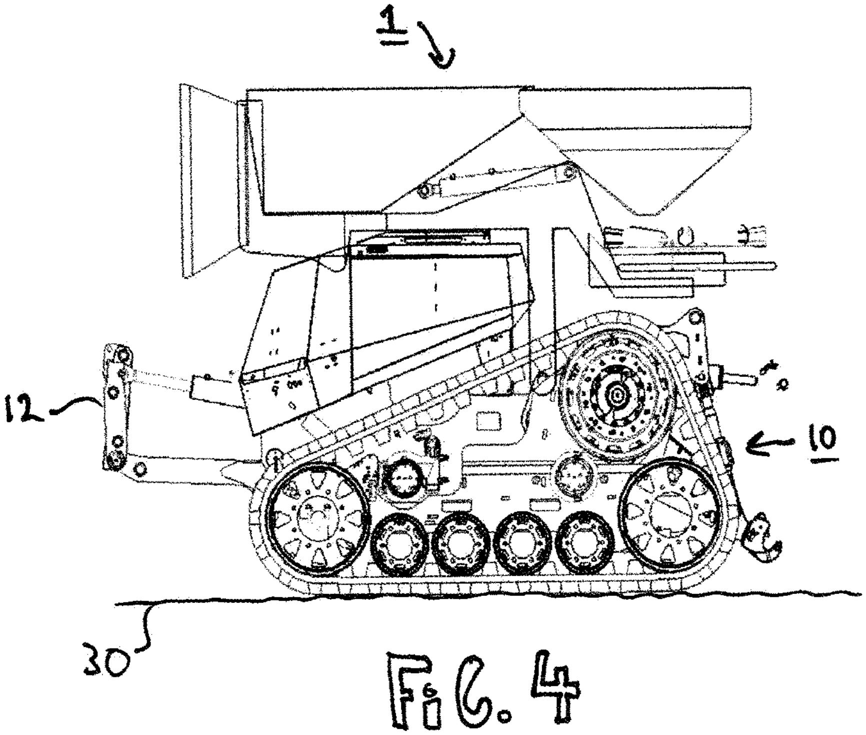
FIG. 4 is a schematic side view of the tractor with the implement in operative connection in an alternative arrangement.

FIG. 4 is a schematic side view of the tractor 10 with the implement 1 in operative connection in an alternative arrangement. In this arrangement the lifting device 12 is de-coupled from the implement. This way, during the crossing of the piece of farmland 30, the lifting device, when desired, can be used for carrying a second agricultural implement.

What is claimed is:

1. A method for cultivating a piece of farmland, using a tractor and connected thereto an agricultural implement for performing an agricultural operation, the method comprising the steps of:

providing the tractor as an autonomous tractor with a lifting device for connecting the agricultural implement to the tractor and with an engine for driving said implement, and crossing the farmland with the tractor while the agricultural implement is driven by the engine to cultivate the piece of farmland, in a first step preceding the cultivation of the farmland, placing the agricultural implement on top of the tractor with said lifting device, such that a center of mass of the agricultural implement is within the footprint of the tractor, and in a second step, operatively connecting the agricultural implement with the engine of the tractor, whereafter the farmland is crossed with the tractor while the agricultural implement is supported by the tractor and driven by the engine thereof to cultivate the piece of farmland wherein after the agricultural implement is placed on top of the tractor with the said lifting device, further comprising the step of de-coupling the lifting device from the implement.

2. A method according to claim 1, wherein the second step is performed automatically while the first step is performed.

3. A method according to claim 1, wherein during the crossing of the piece of farmland, the lifting device is used for carrying a second agricultural implement.

4. A method according to claim 1, wherein the engine is additionally used for driving the autonomous tractor.

5. A method according to claim 1, wherein the agricultural implement is used for an agricultural operation that involves spreading material, other than soil of the farmland itself, over the piece of farmland.

6. A method according to claim 5, wherein the agricultural operation is chosen from the group that consists of 1) spraying of a liquid such as water or crop protection products, 2) sowing of seeds, 3) planting of propagating material, and 4) spreading of solids.

7. A method according to claim 1, wherein after the piece of farmland is cultivated, the agricultural implement is taken off the tractor using the lifting device, whereafter the agricultural implement is de-coupled from the lifting device and stored until further use.

8. A method according to claim 7, wherein the agricultural implement has a longitudinal direction which direction in essence runs parallel to the surface of the piece of farmland when cultivating this farmland, and wherein the agricultural implement is stored with its longitudinal direction extending in essence vertically.

9. A method according to claim 6, wherein:

the planting of propagating material includes the planting of at least one of bulbs, cuttings or young plants, and the spreading of solids includes the spreading of one of artificial fertilizer or manure.

* * * * *